US010063664B2

(12) United States Patent
Kawanoue et al.

(10) Patent No.: US 10,063,664 B2
(45) Date of Patent: Aug. 28, 2018

(54) NETWORK SYSTEM AND CONTROL DEVICE

(71) Applicant: OMRON Corporation, Kyoto-shi, Kyoto (JP)

(72) Inventors: Shinsuke Kawanoue, Kyoto (JP); Hiroshi Kuribayashi, Kyoto (JP)

(73) Assignee: OMRON, Kyoto-shi (JP)

(*) Notice: Subject to any disclaimer, the term of this patent is extended or adjusted under 35 U.S.C. 154(b) by 229 days.

(21) Appl. No.: 14/940,182

(22) Filed: Nov. 13, 2015

(65) Prior Publication Data
US 2016/0142515 A1 May 19, 2016

(30) Foreign Application Priority Data

Nov. 14, 2014 (JP) .................................. 2014-232170
Nov. 12, 2015 (JP) .................................. 2015-221813

(51) Int. Cl.
G06F 15/16 (2006.01)
H04L 29/06 (2006.01)
(Continued)

(52) U.S. Cl.
CPC ............ *H04L 67/42* (2013.01); *H04L 12/189* (2013.01); *H04L 43/065* (2013.01);
(Continued)

(58) Field of Classification Search
CPC ... H04L 67/42; H04L 67/1097; H04L 43/062; H04L 12/189; H04L 67/24; H04L 67/12; H04L 63/10; H04L 65/403; H04L 41/22
See application file for complete search history.

(56) References Cited

U.S. PATENT DOCUMENTS 6,151,625 A 11/2000 Swales et al.
2006/0026672 A1* 2/2006 Braun .................. G05B 19/042
726/9
(Continued)

FOREIGN PATENT DOCUMENTS

CN 1418332 A 5/2003
CN 101162394 A 4/2008
(Continued)

OTHER PUBLICATIONS

The European Office Action dated Aug. 16, 2017 in the counterpart European patent application.
(Continued)

*Primary Examiner* — June Y Sison
*Assistant Examiner* — Steven C Nguyen
(74) *Attorney, Agent, or Firm* — Metrolexis Law Group, PLLC

(57) ABSTRACT

A network system is provided with at least one terminal device, a control device that controls a machine, and a server device that receives data including at least one of image data and audio data from at least one of the control device and the terminal device that are connected via a network, and distributes the received data to a different device from the device that transmitted the data. The control device is provided with a controller that executes a control operation, and a communication unit that transmits data indicating an operational state of the machine that is controlled to the server device. The terminal device includes a display unit that displays the operational state of the machine controlled by the control device together with a state of another terminal device connected to the server device.

6 Claims, 14 Drawing Sheets

(51) Int. Cl.
*H04L 29/08* (2006.01)
*H04L 12/26* (2006.01)
*H04L 12/18* (2006.01)
*H04L 12/24* (2006.01)

(52) U.S. Cl.
CPC .......... *H04L 67/1097* (2013.01); *H04L 41/22* (2013.01); *H04L 63/10* (2013.01); *H04L 65/403* (2013.01); *H04L 67/12* (2013.01); *H04L 67/24* (2013.01)

(56) References Cited

U.S. PATENT DOCUMENTS

| | | | |
|---|---|---|---|
| 2008/0091383 A1* | 4/2008 | Ueno | G05B 23/0256 702/185 |
| 2009/0089225 A1 | 4/2009 | Baier et al. | |
| 2013/0229511 A1 | 9/2013 | Oostendorp et al. | |

FOREIGN PATENT DOCUMENTS

| | | | |
|---|---|---|---|
| CN | 102833252 A | 12/2012 | |
| JP | 2009-258983 A | 11/2009 | |
| JP | 2010-039565 A | 2/2010 | |

OTHER PUBLICATIONS

The Chinese Office Action (CNOA) dated Apr. 18, 2018 in a counterpart Chinese patent application.

* cited by examiner

FIG. 6

| ITEM NAME | | USER VARIABLE 1 | USER VARIABLE 2 | ... |
|---|---|---|---|---|
| ID | | U0001 | U0002 | ... |
| VARIABLE NAME | | ProduceNum | WorkingHour | ... |
| VALUE | | 8 | 3 | ... |
| NOTIFICATION CONDITION 1 | NOTIFICATION TYPE | EVENT | EVENT | ... |
| | NOTIFICATION CONDITIONAL EXPRESSION | (ProduceNum < 300) AND (WorkingHour > 10) | NULL | ... |
| | NOTIFICATION DESTINATION | [0001, 0003, 0004] | [0001, 0002] | ... |
| | NOTIFICATION LEVEL | 5 | 1 | ... |
| NOTIFICATION CONDITION 2 | | | | ... |
| ADDITIONAL INFORMATION | | ["PRODUCTION VOLUME", "FILLING MACHINE", "A6"] | ["OPERATING TIME", "FILLING MACHINE", "A6"] | ... |

1521 — ID
1522 — VARIABLE NAME
1523 — VALUE
1524 — NOTIFICATION CONDITION 1
1525 — NOTIFICATION CONDITION 2
1526 — ADDITIONAL INFORMATION

| ITEM NAME | USER 1 | USER 2 | USER 3 |
|---|---|---|---|
| ID | 0000 | 0001 | 0002 |
| USER NAME | "FILLING MACHINE A6" | "SUZUKI" | "SATO" |
| ADDITIONAL INFORMATION | "CC FACTORY" | "PRODUCTION, CC COMPANY" | "EQUIPMENT DEVELOPMENT, DD COMPANY" |
| E-MAIL ADDRESS | NULL | suzuki@cc.com | Sato@dd.com |
| PASSWORD | xxxxxxxx | xxxxxxxx | xxxxxxxx |
| ACCESS LEVEL | 5 | 3 | 1 |
| ... | ... | ... | ... |

154

1541 — ID
1542 — USER NAME
1543 — ADDITIONAL INFORMATION
1544 — E-MAIL ADDRESS
1545 — PASSWORD
1546 — ACCESS LEVEL

FIG. 8

| ITEM NAME | SCREEN ELEMENT 1 | SCREEN ELEMENT 2 | SCREEN ELEMENT 3 | ... |
|---|---|---|---|---|
| ID | S000 | S001 | S002 | ... |
| NAME | CONNECTED USER LIST | CAMERA A IMAGE | EQUIPMENT MANUAL | ... |
| URI | http://abc.com/list | http://cc.com/camera-a | http://dd.com/man | ... |
| ACCESS LEVEL | 1 | 3 | 1 | ... |

156

1561 — ID
1562 — NAME
1563 — URI
1564 — ACCESS LEVEL

FIG. 14

| Key | | | Value | DESCRIPTION | |
|---|---|---|---|---|---|
| Class | | | Add/Update/Delete/Notify/Request/Response | NOTIFICATION CLASS | 502 |
| ID | | | NUMBER | | 504 |
| TimeStamp | | | TEXT | DATE/TIME INFORMATION | 506 |
| Variable (LAYOUT) | ID | | TEXT | VARIABLE MANAGEMENT INFORMATION | 508 |
| | VARIABLE NAME | | TEXT | | |
| | NOTIFICATION CONDITION | TYPE | Event/Periodic | | |
| | | CONDITIONAL EXPRESSION | TEXT | | |
| | | NOTIFICATION DESTINATION | TEXT (LAYOUT) | | |
| User (LAYOUT) | ID | | TEXT | | 510 |
| | USER NAME | | TEXT | | |
| | ADDITIONAL INFORMATION | | TEXT | | |
| | E-MAIL ADDRESS | | TEXT | | |
| | ACCESS LEVEL | | NUMBER | | |
| Screen (LAYOUT) | ID | | TEXT | SCREEN CONFIGURATION INFORMATION | 512 |
| | NAME | | TEXT | | |
| | URI | | TEXT | | |
| | ACCESS LEVEL | | NUMBER | | |
| Message | VARIABLE NAME | | TEXT | NOTIFICATION CONTENTS, ADDRESS | 514 |
| | VALUE | | TEXT | | |
| | Severity | | NUMBER | | |
| | ADDRESS | | TEXT (LAYOUT) | | |
| Keyword | | | TEXT | Request (FOR INQUIRY) | 516 |
| Status | | | NUMBER | REPLY(FOR RESPONSE) | 518 |

NETWORK SYSTEM AND CONTROL DEVICE

CROSS-REFERENCES TO RELATED APPLICATIONS

This application claims priority to Japanese Patent Application No. 2014-232170 filed Nov. 14, 2014 and No. 2015-221813 filed Nov. 12, 2015, the entire contents of which are incorporated herein by reference.

FIELD

The present invention relates to a network system including a control device that controls a control target and to the control device.

BACKGROUND

Systems for accessing information on devices that are operating at a remote location via a network are conventionally known. Such systems are also used for specifying the cause and assisting recovery from a remote location, in the case where a device is operating anomalously or malfunctioning.

For example, JP 2009-258983A discloses a remote maintenance system directed toward numerical control devices. This remote maintenance system displays the operating status of a machine tool on a display device provided in a numerical control device, and transmits screen display data of the display device via an Internet connection to a computer that is for use in remote maintenance. The computer for use in remote maintenance displays the data for screen display, and controls the numerical control device based on this display.

Also, JP 2010-039565A discloses a system that is constituted by a data collection device that collects data from apparatuses and transmits the collected data to a server device, the server device that receives and stores the data transmitted from the data collection device, and a terminal device that accesses the server device and receives data. Employing such a configuration enables security to be provided while eliminating the need for a terminal device to directly access a data device.

JP 2009-258983A and JP 2010-039565A are examples of background art.

SUMMARY

With conventional technology such as mentioned above, even though information indicating an operational state or the like that is held by a device can be accessed, the information indicating an operational state that is held by the device cannot be shared in conjunction with information indicating the operating state of the device itself. Also, a plurality of terminals are not able to simultaneously access the information indicating an operational state that is held by the device and the information indicating the operating state of the device itself.

Thus, there is demand for a system that enables a device to share its operating state with a plurality of persons in conjunction with information indicating an operational state of a device, in a situation in which maintenance is performed from a remote location.

A network system according to an aspect of the present invention includes at least one terminal device, a control device configured to control a machine, and a server device configured to receive data including at least one of image data and audio data from at least one of the control device and the terminal device that are connected via a network, and to distribute the received data to a different device from the device that transmitted the data. The control device includes a controller configured to execute a control operation, and a communication unit configured to transmit data indicating an operational state of the machine that is controlled to the server device. The terminal device includes a display unit configured to display the operational state of the machine controlled by the control device together with a state of another terminal device connected to the server device.

Preferably, the control device includes a storage configured to store setting information defining users that can access respective data held by the server device, and the server device is configured to restrict users that can access the held data, in accordance with the setting information from the control device.

According to this configuration, the access level that is given to each of a plurality of users can be managed with the control device, thereby enabling communication and notification destinations to be restricted.

Preferably, the control device is configured to start a network connection with the server device when an occurrence of a preregistered anomaly is detected.

According to this configuration, the control device is able to provide a notification when an anomaly occurs, enabling the problem to be dealt with quickly.

Preferably, the control device includes a storage configured to store setting information associating attribute information with input/output information collected from the machine that is controlled, and the control device is configured to perform a search as to whether attribute information corresponding to text included in a message distributed from the server device exists, and, when attribute information corresponding to the text is retrieved, to transmit input/output information corresponding to the retrieved attribute information to the server device.

According to this configuration, arbitrary data within the control device can be accessed without preprogramming.

According to another aspect of the present invention, a control device that controls a machine is provided. The control device includes a communication unit configured to network-connect to a server device and at least one terminal device, and a controller configured to execute a control operation. The server device is configured to receive data including at least one of image data and audio data from at least one of the control device and the terminal device that are connected via a network, and to distribute the received data to a different device from the device that transmitted the data, and the communication unit is configured to transmit data indicating an operational state of the machine that is controlled to the server device.

Preferably, the control device further includes a storage configured to store setting information associating attribute information with input/output information collected from the machine that is controlled, and the control device is configured to perform a search as to whether attribute information corresponding to text included in a message distributed from the server device exists, and, when attribute information corresponding to the text is retrieved, to transmit input/output information corresponding to the retrieved attribute information to the server device.

According to the present embodiment, a system can be realized that enables a device to share its operating state with a plurality of persons in conjunction with information indicating an operational state of a device, in a situation in which maintenance is performed from a remote location.

BRIEF DESCRIPTION OF THE DRAWINGS

FIG. 6 is a diagram showing an exemplary data structure of variable management information that is used in the maintenance system of the present embodiment.

FIG. 7 is a diagram showing an exemplary data structure of user management information that is used in the maintenance system of the present embodiment.

FIG. 8 is a diagram showing an exemplary data structure of screen configuration information that is used in the maintenance system of the present embodiment.

FIG. 14 is a diagram showing an exemplary data object format that is used in the maintenance system of the present embodiment.

DETAILED DESCRIPTION

Figure 1:
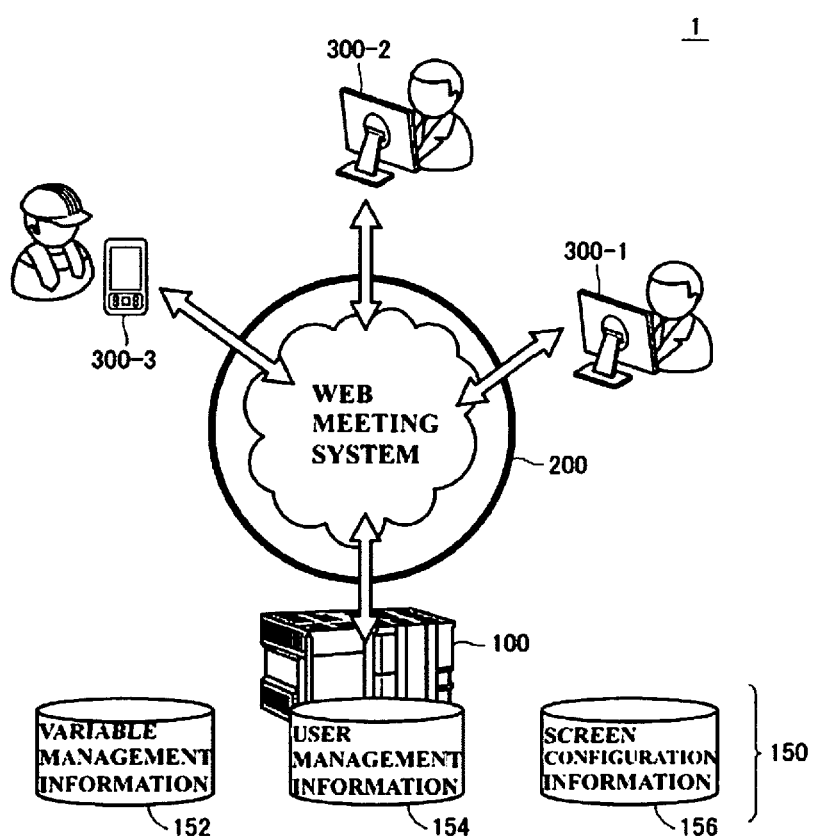
FIG. 1 is a schematic diagram showing an exemplary configuration of a maintenance system of the present embodiment.

Embodiments of the present invention will be described in detail with reference to drawings. Note that identical or corresponding portions in the drawings will be given the same reference numerals and description thereof will not be repeated. In the present embodiment, a maintenance system 1 will be described as an exemplary network according to the instant invention. Although the term "maintenance system" is intended to express the main form of usage of this system, the technical scope of the instant invention is not limited to the scope of this term, and it is to be interpreted rationally based on the disclosure in the claims.

A. Configuration of Maintenance System 1

First, the configuration of the maintenance system 1 of the present embodiment will be described. FIG. 1 is a schematic diagram showing an exemplary configuration of the maintenance system 1 of the present embodiment. Referring to FIG. 1, the maintenance system 1 of the present embodiment includes a control device 100 that controls machines, a server device 200, at least one of terminal devices 300-1, 300-2, 300-3, and so on (hereinafter collectively referred to as "terminal devices 300").

The control device 100 is, for example, an industrial controller called a PLC (Programmable Logic Controller), and controls various types of machines (production equipment, robots, displays, etc.) that are not illustrated. As a control performed by the control device 100 on a machine, a control output is calculated by acquiring required information from the machine using a sensor or the like and executing a predetermined control operation using the input information, in accordance with a program that is executed by the control device 100, and the calculated control output is provided to the controlled machine (typically, an actuator).

The maintenance system 1 of the present embodiment has an electronic meeting system that is capable of sharing various types of digital information (multimedia information) in real time. The server device 200 provides this electronic meeting system. More specifically, the server device 200 receives data including at least one of image data and audio data from at least one of the terminal device 300 and the control device 100 that are connected via a network, and distributes the received data to a different device from the device that transmitted the data, together with holding the data permanently or temporarily. Distribution of data can be realized using any suitable method. That is, a method involving the server device 200 multicasting or broadcasting data to all devices that are connected to the network may be employed, or a mode in which the server device 200 holds data to be shared and the respective devices connected to the network access the held data may be adopted. Note that the server device 200 may be configured to hold the data centrally while the electronic meeting system is activated so that the data can be shared among a plurality of devices, although from a security point of view it is preferable to automatically delete the data that is being shared when the electronic meeting system is disabled (terminated).

A web meeting system is illustrated in FIG. 1 as a typical example of an electronic meeting system, but any system that is configured to be able to share digital information between the control device 100 and one or more terminal devices 300 may be employed, irrespective of the mode of the system or what the system is called. For example, a system called a "video conference system" may be employed, and any new system that is implemented in the future may be employed. Also, an electronic meeting system may be provided on a private network that only specific users can access, or on a public network such as the Internet. In all cases, it is preferable to use a password or the like to place access restrictions on users.

Furthermore, a plurality of network systems may be utilized in combination. As will be discussed later, the control device 100 of the present embodiment is also capable of executing required processing in response to a message posted by any of the users, and realizes interactive behavior. Thus, systems such as chat systems and MMS (Multimedia Messaging Service), for example, can also be utilized.

In the maintenance system 1 of the present embodiment, the control device 100 is capable of participating in the electronic meeting system, in the similar manner to a user. That is, from the viewpoint of the user of a given terminal device 300, the control device 100 appears like one of the users, similar to another terminal device 300 (or the user of another terminal device 300). Note that the control device 100 is also able to act like a plurality of users by using virtual technology.

The user of each terminal device 300 is also able to exchange electronic data with the control device 100, like in a similar manner to being able to exchange (share) electronic data with the users of other terminal devices 300. More specifically, the control device 100 transmits various information that is held therein to the electronic meeting system, and receives information (commands) or the like from any of the terminal devices 300 connected to the electronic meeting system. As a typical implementation configuration, the server device 200 collects information from the respective devices (control device 100 and/or terminal devices 300) participating in the electronic meeting system, and transmits or distributes collected information in response to requests from these devices.

In the maintenance system 1 of the present embodiment, interactive maintenance activities are possible between the control device 100 and the server device 200 and/or the terminal devices 300.

Note that the control device 100 controls devices to be controlled, and needs to prevent unauthorized access from outside or the like. Thus, in the maintenance system 1 of the present embodiment, the contents of sharable information, the sharable range of information and the like can be restricted according to the type, attribute or the like of devices (or users) participating in the electronic meeting system.

As an example, FIG. 1 shows an exemplary configuration in which the control device 100 holds setting information 150 for configuring appropriate settings in the electronic meeting system of the present embodiment. More specifically, as examples of setting information 150, the control device 100 holds variable management information 152, user management information 154 and screen configuration information 156. Typically, the administrator/owner of the control device 100 decides the contents of this setting information 150 in advance according to the situation. More specifically, the setting information 150 includes information relating to the terminal devices 300 participating in the electronic meeting system and information relating to the users who use the terminal devices 300.

FIG. 1 shows an exemplary configuration in which the control device 100 holds all of the setting information 150, although a configuration may be adopted in which another device holds some or all of this setting information 150. For example, in an exemplary configuration in which a plurality of control devices 100 participate in the electronic meeting system, a configuration may be adopted in which any one of the control devices 100 holds all of the setting information 150 or the plurality of control devices 100 respectively hold some of the setting information 150. Alternatively, a configuration may be adopted in which the server device 200 or one of the terminal devices 300 holds some or all of the setting information 150. Hereinafter, as a typical example, a configuration in which the setting information 150 is held in the control device 100 will be mainly described.

B. Configuration of Control Device 100

Figure 2:
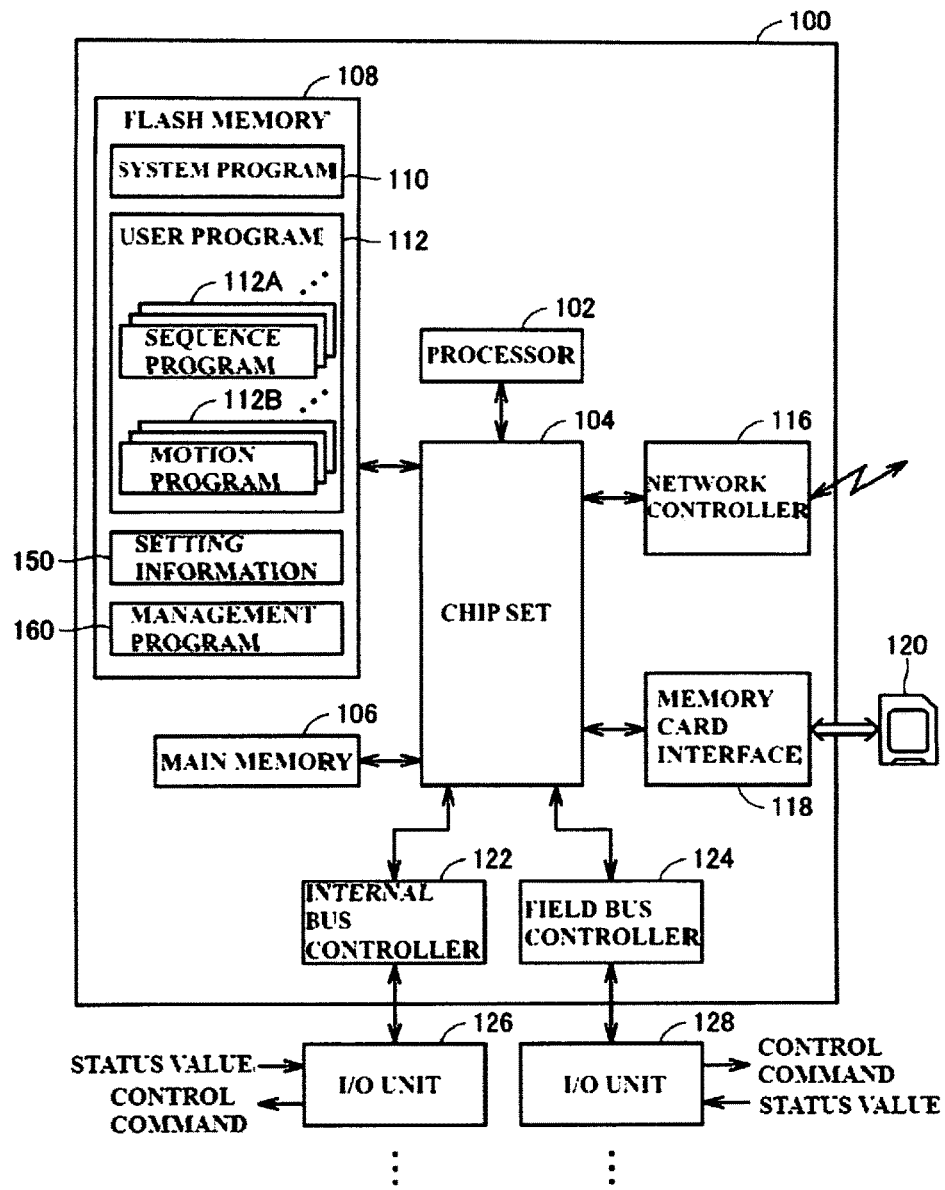
FIG. 2 is a schematic diagram showing an exemplary configuration of a control device of the present embodiment.

Next, the configuration of the control device 100 will be described. FIG. 2 is a schematic diagram showing an exemplary configuration of the control device 100 of the present embodiment. Referring to FIG. 2, the control device 100 realizes control of a control target as a result of a processor executing preinstalled computer programs. More specifically, the control device 100 includes a processor 102 such as a CPU (Central Processing Unit) or an MPU (Micro-Processing Unit), a chip set 104, a main memory 106, a flash memory 108, a network controller 116, a memory card interface 118, an internal bus controller 122, and a field bus controller 124.

The processor 102 controls a control target by reading out a system program 110 and a user program 112 that are stored in the flash memory 108, expanding the read programs in the main memory 106 and executing the expanded programs. That is, the processor 102 realizes a controller that executes a control operation by coordinating with the main memory 106 and the flash memory 108.

The system program 110 includes instruction code for providing basic functions of the control device 100, such as data input/output processing and execution timing control. The user program 112 is suitably designed according to the control target, and includes a sequence program 112A for executing sequence control and a motion program 112B for executing motion control.

The chip set 104 realizes the overall processing of the control device 100 by controlling the respective components. The internal bus controller 122 is an interface that exchanges data with an I/O unit 126 that is connected to the control device 100 through an internal bus. The field bus controller 124 is an interface that exchanges data with an I/O unit 128 that is connected to the control device 100 through a field bus. The internal bus controller 122 and the field bus controller 124 acquire control status values that are respectively input from the corresponding I/O units 126 and 128, and respectively output operation results of the processor 102 through the corresponding I/O units 126 and 128 as control commands.

The memory card interface 118 is configured to have a memory card 120 removably attached thereto, and is capable of writing data to the memory card 120 and reading data from the memory card 120.

The network controller 116 controls data exchange through various types of cable/wireless networks. In the maintenance system 1 of the present embodiment, data is exchanged with the electronic meeting system through the network controller 116. That is, the network controller 116 is equivalent to a communication unit that can be network-connected to the server device 200 and at least one terminal device 300.

The flash memory 108 holds further setting information 150 and a management program 160 that are for realizing the maintenance system 1 of the present embodiment. The setting information 150, as described with reference to FIG. 1, includes variable management information 152, user management information 154, and screen configuration information 156. The management program 160 controls exchange of data with the electronic meeting system, based on information such as the setting information 150.

Note that some or all of the functions that are provided by the control device 100 executing computer programs may be implemented as dedicated hardware circuitry.

Figure 3:
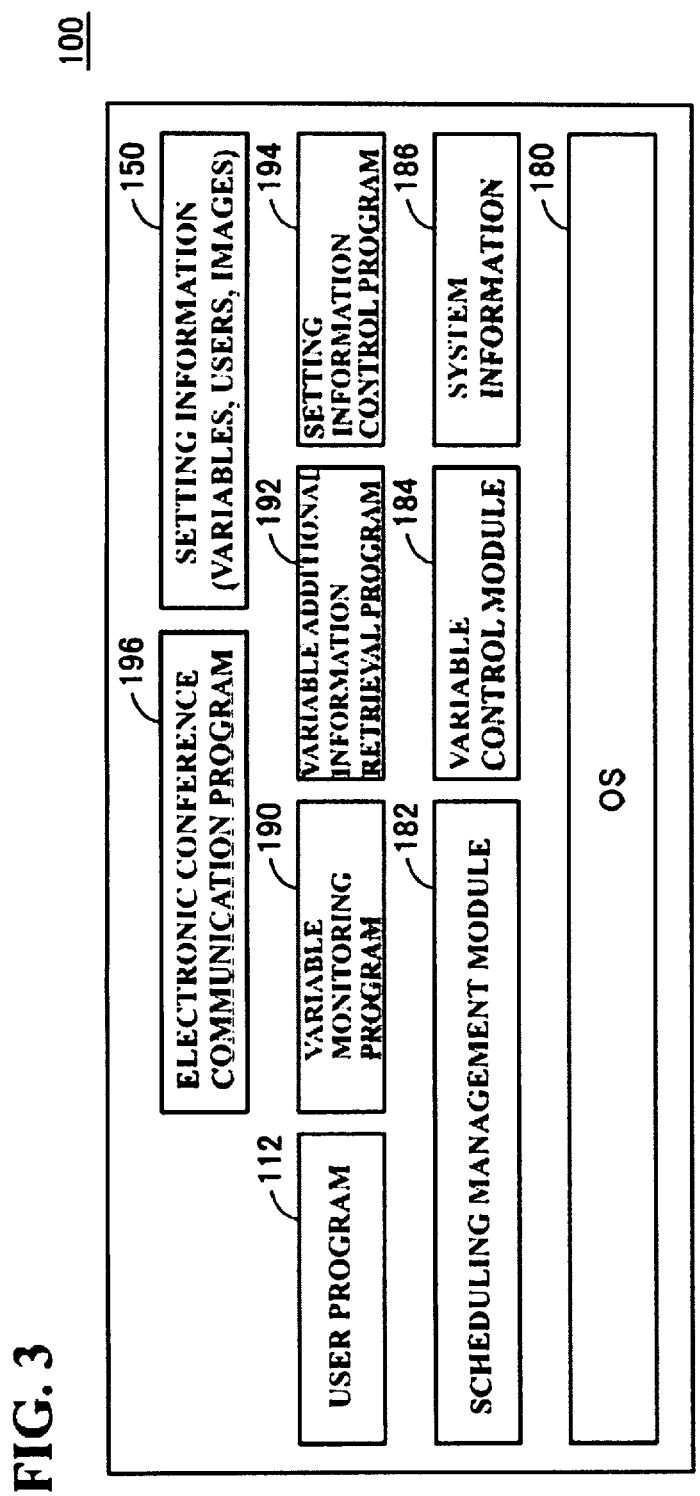
FIG. 3 is a schematic diagram showing an exemplary software configuration of the control device of the present embodiment.

Next, a software configuration for realizing the functions that are provided by the control device 100 will be described. FIG. 3 is a schematic diagram showing an exemplary software configuration of the control device 100 of the present embodiment. Referring to FIG. 3, a software configuration such as shown in FIG. 3 is realized by the processor 102 of the control device 100 expanding programs that are installed on the flash memory 108 (FIG. 2) or the like and executing the expanded programs.

More specifically, the control device 100 includes, as a software-like configuration, an OS (Operating System) 180, a scheduling management module 182, a variable control module 184, system information 186, a user program 112, a variable monitoring program 190, a variable additional information retrieval program 192, a setting information control program 194, an electronic conference communication program 196, and setting information 150.

The OS 180 provides an execution environment for programs on the control device 100, and executes various processing required in system maintenance.

The scheduling management module 182 manages starting of the user program 112 at an appropriate timing. The variable control module 184 administers resource control by the control device 100. The result of resource control by the variable control module 184 is reflected in the system information 186.

The setting information 150 is a database of variables, users and screen configuration management, as will be discussed later.

The electronic conference communication program 196 performs session establishment/communication with the electronic meeting system (server device 200).

The variable monitoring program 190 monitors variables every task period, and checks whether any of the notification conditions are met.

The variable additional information retrieval program 192 retrieves additional information associated with the variables based on keywords that are included in messages transmitted from the electronic meeting system.

The setting information control program 194 checks whether updating of the various types of setting information 150 has been requested by the electronic meeting system and performs the actual update processing.

Information such as the type of electronic meeting system, communication protocols and the like are stored in the system information 186.

Note that only one implementation example of the software configuration is shown in FIG. 3, and any suitable implementation configuration can be employed.

C. Configuration of Server Device 200 and Terminal Devices 300

Figure 4:
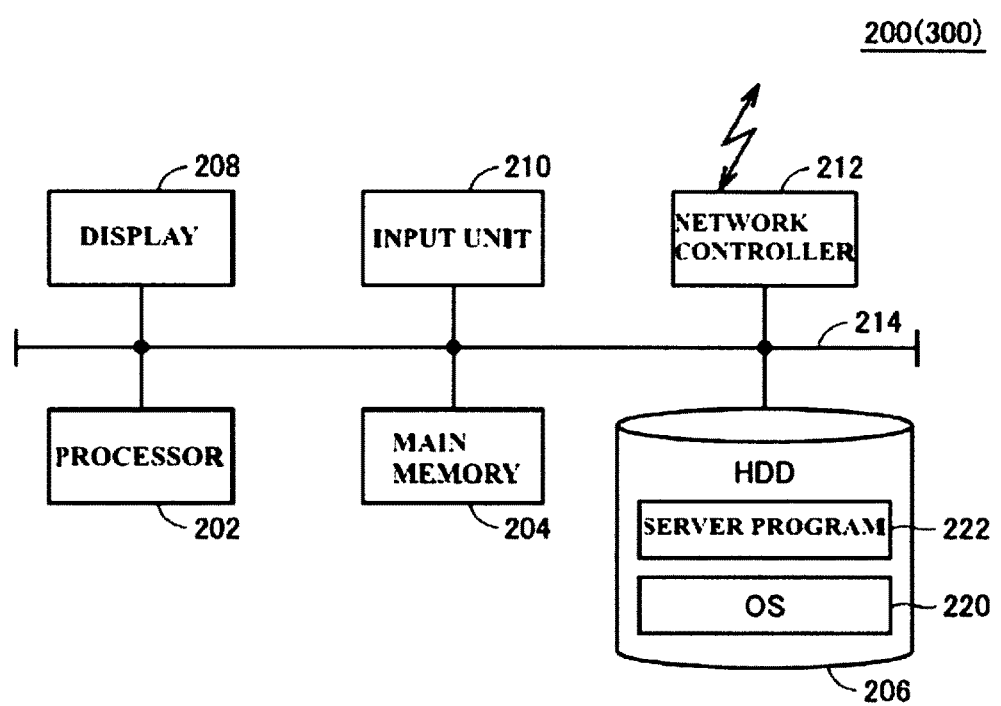
FIG. 4 is a schematic diagram showing an exemplary configuration of a server device of the present embodiment.

Next, the configuration of the server device 200 and the terminal devices 300 will be described. FIG. 4 is a schematic diagram showing an exemplary configuration of the server device 200 of the present embodiment. Referring to FIG. 4, the server device 200 is a computer having a general-purpose architecture. The server device 200 realizes various processing that will be discussed later, as a result of a processor executing preinstalled computer programs.

The server device 200 includes a processor 202 such as a CPU or an MPU, a main memory 204, a hard disk (HDD) 206, a display 208 for presenting information to a user, an input unit 210 such as a keyboard and a mouse, and a network controller 212 for exchanging data with other devices. These components are connected to each other in a manner that enables data communication via an internal bus 214. The hard disk 206 holds an OS (Operating System) 220 for providing an execution environment for basic programs in the server device 200, and a meeting management program 222 for providing an electronic meeting system. These programs are read to the main memory 204 and executed by the processor 202.

The configuration employed for the terminal devices 300 is basically similar to the server device 200. Unlike the server device 200, however, a meeting management program 222 does not need to be installed on the hard disk, and a program (typically, a browser application, etc.) for accessing the server device 200 is installed instead.

Also, the terminal devices 300 may be general-purpose personal computers or portable devices (smart phones, tablets, etc.).

Note that some or all of the functions that are provided by the server device 200 and the terminal devices 300 executing computer programs may be implemented as dedicated hardware circuitry.

D. Usage Example

Next, a typical usage example will be described, in order to facilitate understanding of the convenience of the maintenance system 1 of the present embodiment.

Referring to FIG. 1, it is envisaged that the maintenance system 1 of the present embodiment assists in the business of maintaining remotely located devices. In maintaining such remotely located devices (typically, in a factory), it is preferable that a user such as a device vendor who supplied the devices to the factory is also connect in addition to an on-site operator or administrator of the company that maintains the factory. That is, as a typical usage configuration of the maintenance system 1 of the present embodiment, it is envisaged that, in the case where a given device is operating anomalously, malfunctioning or the like, users who belong to the organization that owns or holds the devices as well as users who were involved in planning or the like and have extensive knowledge of the devices (but do not belong to the organization that owns the devices) consult together to solve the problem quickly by sharing basically the same information.

As will be discussed later, a user who is the device vendor takes responsibility for the supplied devices themselves but is not involved in the actual running of the factory, and only very limited information is provided to this user in comparison to users who belong to the organization that owns the factory. That is, in the maintenance system 1 of the present embodiment, while it is possible to share information interactively among respective users participating in the electronic meeting system, it is also possible, at the same time, to restrict the access of respective users to information as needed. As one technique for implementing such access management, in the present embodiment, an "access level" is set for each user and/or type of information, and it is determined whether to permit access when a given user tries to access certain information, based on this "access level".

Figure 5A:
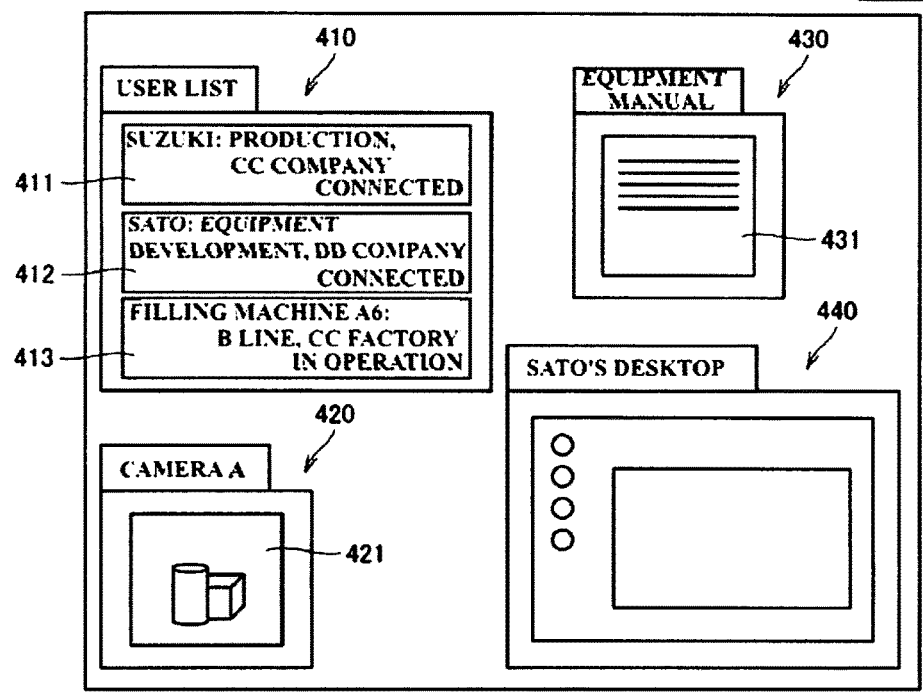
FIGS. 5A and 5B are diagrams showing exemplary screens that are provided to terminal devices by the maintenance system of the present embodiment.
Figure 5B:
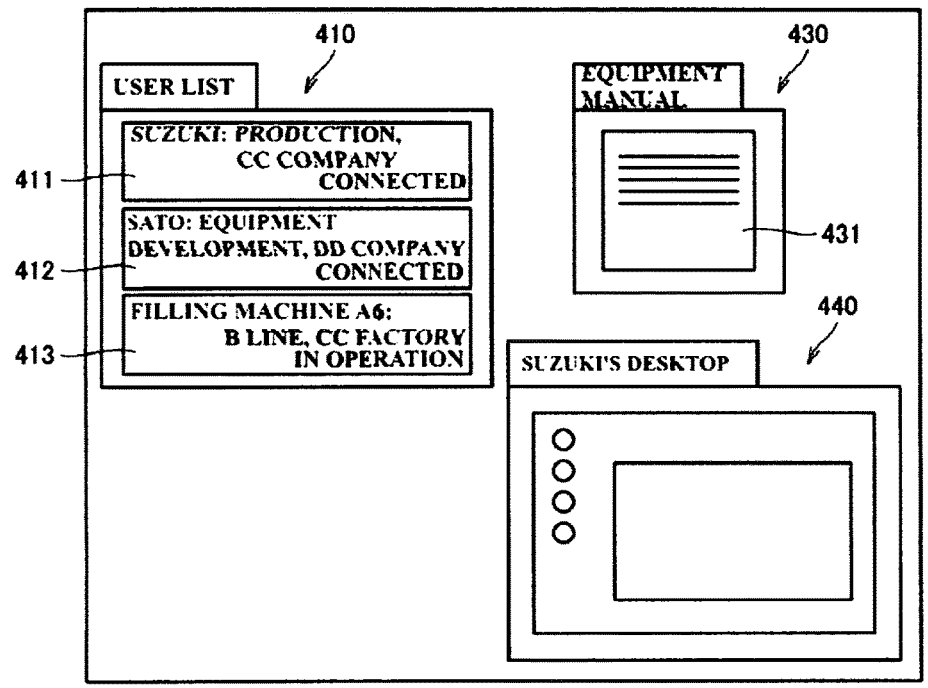

In an exemplary configuration of the maintenance system 1 shown in FIG. 1, an administrator of the user who owns the factory uses a terminal device 300-1, and the user who is the device vendor uses a terminal device 300-2. FIG. 5 are diagrams showing exemplary screens that the maintenance system 1 of the present embodiment provides to the terminal devices 300. FIG. 5A shows an exemplary screen that is provided on the terminal device 300-1, and FIG. 5B shows an exemplary screen that is provided on the terminal device 300-2.

Referring to FIG. 5, selectably displayed on the screen that is provided on the terminal devices 300 are screen elements such as a user list 410 that enables the statuses of users to be checked, a camera window 420 showing an image 421 from a camera installed on site, an object window 430 displaying an object 431 (any of various types of documents such as an equipment manual) that is held on a shared server or the electronic meeting system, and a desktop object 440 showing the status of a terminal device 300 that another user is using. The screen elements that can be displayed on the terminal device 300 of each user depend on the access level that is allocated to the user who is using that terminal device 300.

Note that the image 421 displayed in the camera window 420 may be an image of a suitable location captured by the terminal device 300-3 (typically, a mobile terminal) that is used in by an on-site worker or the like. Sharing of information can be simplified by (mutually) displaying the desktop object 440.

For example, the statuses (attribute information and information indicating the operational state "connected") of "Suzuki" and "Sato", who are the users using the terminal devices 300-1 and 300-2 (i.e., users logged in to the electronic meeting system) are displayed in the user list 410, and each user is able to recognize at a glance that the other party is logged in to the same electronic meeting system. Furthermore, the control device 100 is logged in to the electronic meeting system as a virtual user, and information indicating the status of the control device 100 (attribute information and information indicating the operational state "connected") is displayed in the user list 410 together with the information indicating the status of the real users.

That is, the communication unit of the control device 100 transmits data showing the operational states of controlled machines the server device 200. The terminal devices 300 have a display (display unit) that displays the operational state of machines that are controlled by the control device 100 together with the states of other terminal devices 300 that are connected to the server device 200.

Also, the camera window 420 is displayed only on the screen of the terminal device 300-1, and is not displayed on the screen of the terminal device 300-2. This is because the image 421 in the camera window 420 is information could possibly concern a type of trade secret, namely, the operational state of the factory, and is not directly required in the maintenance work carried out by the user who is the device vendor, and thus it is assumed that this information has been set in advance to not be provided to the user who is the device vendor.

In the maintenance system 1 of the present embodiment, the control device 100 is able to act like a user, and is thus also able to transmit a notification message to the participating users through the electronic meeting system, in the case where, for example, some sort of abnormal operation or malfunction occurs in any of the machines that are controlled by the control device 100. Alternatively, when any of the users participating in the electronic meeting system transmits a message to the control device 100, the control device 100 is able to extract a keyword or the like that are included in the message and response according to the extracted keyword. An interactive environment including bidirectional information exchange can thus be provided between users and the control device 100.

E. Data Structure of Setting Information 150

Next, an exemplary data structure of the setting information 150 that is used in the maintenance system 1 of the present embodiment will be described. As mentioned above, in the present embodiment, the control device 100 holds the setting information 150, and when connecting to the electronic meeting system, the control device 100 provides (uploads) the setting information 150 to the server device 200 to set up the electronic meeting system in a preset state.

e1: Variable Management Information 152

FIG. 6 is a diagram showing an exemplary data structure of the variable management information 152 that is used in the maintenance system 1 of the present embodiment. Referring to FIG. 6, the variable management information 152 specifies conditions for the control device 100 to transmit information to the electronic meeting system, the type of information to be transmitted, and the like. Variables that are managed using the variable management information 152 include the variables of programs created by users (hereinafter, "user variables") and variables that are held as a system by the control device 100 (hereinafter, "system variables"). User variables can include information on I/O allocation with the I/O unit 126 that is connected to the control device 100 or the like, rather than only variables that users have created. That is, the control device 100 stores the variable management information 152 as setting information that associates attribute information with input/output information (I/O data) that is collected from machines that are being controlled.

More specifically, an ID 1521, a variable name 1522, a value 1523, notification conditions 1524 and 1525 and additional information 1526 are defined as components in the variable management information 152 for every user variable.

Identification information/identification numbers uniquely specifying each user variable are stored in the ID 1521. Aliases that are set such that users can grasp at a glance the contents of each user variable are stored in the variable name 1522.

Conditions for transmitting messages to the electronic meeting system when some sort of event occurs in the control device 100 are stored as the notification conditions. These notification conditions 1524 and 1525 can be suitably set and changed by users, and a plurality of conditions can be set. More specifically, the notification conditions 1524 and 1525 are configured as components such as notification type, conditional expression, notification destination, and notification level.

The notification type in the notification condition 1524 determines the notification timing, and, specifically, "cyclic" indicating that notification will be given periodically and "event" for giving notification when a corresponding condition is satisfied are selectable as notification types. The value 1523 in the variable management information 152 shown in FIG. 6 shows a period (time interval) for determining periodically whether a corresponding condition is satisfied. In the example shown in FIG. 6, an integer value in units of milliseconds is set.

An example of an arithmetic expression premised on a true/false return value is shown as a conditional expression in the notification condition 1524. In the example shown in FIG. 6, binary arithmetic expressions are the smallest unit. Operands are set using monitoring variables or literal values and various operators (e.g., ==, !=, ≥, ≤, >, <, /, %, &&, ||). Note that, in the example shown in FIG. 6, the return value will be "true" if the corresponding values change when "NULL" is set in the conditional expression, and corresponding processing will thus be executed.

The notification level in the notification condition 1524 is set to an integer value indicating the priority of the notification, with larger numbers being set for higher levels.

The notification destination in the notification condition 1524 is set using an ID that is defined in the user management information 154 (discussed later). A plurality of notification destinations can also be designated.

Multiple comments can be suitably added to the additional information 1526, in addition to comments relating to variables that are referred to by the user program 112 and comments relating to variables that are prepared in advance by the system.

The control device 100 will transmit corresponding information to a designated notification destination via the electronic meeting system, in the case where an event matching such variable management information 152 occurs in a control target.

e2: User Management Information 154

FIG. 7 is a diagram showing an exemplary data structure of the user management information 154 that is used in the maintenance system 1 of the present embodiment. Referring to FIG. 7, the user management information 154 specifies users who can connect (log in) to the electronic meeting system. That is, the control device 100 stores the user management information 154 serving as setting information defining users who can access the respective data that is held by the server device 200. The server device 200 then executes access management as a result of the user management information 154 being provided to the server device 200 by the control device 100. In other words, the server device 200 restricts users who can access held data, in accordance with the setting information (user management information 154) from the control device 100.

More specifically, an ID 1541, a user name 1542, additional information 1543, an e-mail address 1544, a password 1545 and an access level 1546 are provided as components in the user management information 154 for every user.

Identification information/identification numbers uniquely specifying each user are stored in the ID 1541. Aliases that are set such each user can be grasped at a glance are stored in the user name 1542. The user name 1542 is used for displaying each user in the user list 410 (FIG. 5), for example. Information relating to each user is stored in the additional information 1543, and is displayed together with the contents of the corresponding user name 1542.

The user name 1542 (or the e-mail address 1544) and the password 1545 are used when each user accesses the electronic meeting system. That is, this information is used in an authentication procedure that is performed when each user logs in to the electronic meeting system. Note that the password 1545 is encrypted and stored, and may be decrypted as needed when the electronic meeting system (server device 200) executes authentication processing on each user.

The access level 1546 is a value (typically, a raw integer value is used) indicating the level of information that a corresponding user can access, and, in the present embodiment, a larger value indicates a higher level (a configuration may be implemented in which a smaller value indicates a higher level).

Note that the control device 100, which manages these components, is itself also registers in the user management information 154, and the access level thereof is set to the highest level (generally set to full access rights).

e3: Screen Configuration Information 156

FIG. 8 is a diagram showing an exemplary data structure of the screen configuration information 156 that is used in the maintenance system 1 of the present embodiment. Referring to FIG. 8, the screen configuration information 156 defines screen elements that can be displayed on the terminal device 300 of each user.

More specifically, an ID 1561, a name 1562, a URI (Uniform Resource Identifier) 1563 and an access level 1564 are defined as components in the screen configuration information 156 for every screen element.

Identification information/identification numbers uniquely specifying each screen element are stored in the ID 1561. Aliases that are set such that each screen element can be grasped at a glance are stored in the name 1562. The position at which the source of a corresponding screen element exists is stored in the URI 1564. That is, the contents of each screen element are constructed dynamically, based on link information that is described in corresponding screen configuration information 156.

The access level 1564 is a value (typically, a raw integer value is used) indicating the level of information that a corresponding user can access, and, in the present embodiment, a larger value indicates a higher level (a configuration may be implemented in which a smaller value indicates a higher level). The access level 1564 is a program for controlling access management with respect to corresponding contents, the access level 1564. Only users who are given an access level the same as the access level 1564 or slightly higher than the access level 1564 are permitted access. In the maintenance system 1 of the present embodiment, access management is thus realized using access level values set for the respective users and screen elements.

Figure 9A:
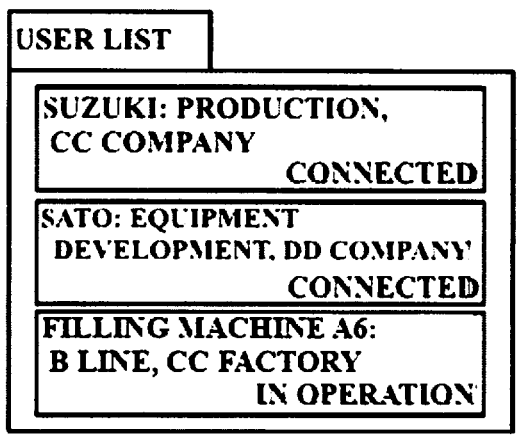
FIGS. 9A, 9B and 9C are schematic diagrams showing respective screen elements corresponding to the screen configuration information shown in FIG. 8.
Figure 9B:
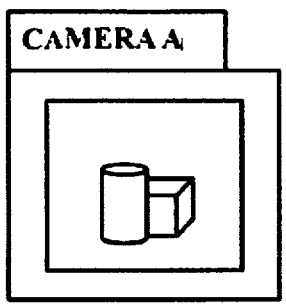
Figure 9C:
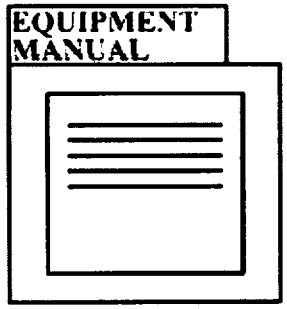

FIG. 9 are schematic diagrams respectively showing screen elements corresponding to the screen configuration information 156 shown in FIG. 8. The user list 410 is shown in FIG. 9A, the camera window 420 is shown in FIG. 9B, and the object window 430 is shown in FIG. 9C. Some or all of these screen elements will be selectably provided on the terminal device 300 of each user.

F. Operations in Maintenance System 1

In the maintenance system 1 of the present embodiment, the control device 100, the server device 200 and the terminal devices 300 operate in the following manner.

The control device 100 monitors the values of the variables (user variables and/or system variables) every task period, and notifies the server device 200 when the values of monitored variables satisfy the notification condition 1524 (conditional expression) set in advance. The server device 200 transmits an e-mail in accordance with an address list of notification destinations corresponding to the satisfied notification condition 1524.

The control device 100 monitors messages that are exchanged among users in the electronic meeting system. When there is a monitored message whose contents match the additional information on a variable, the control device 100 notifies the server device 200.

A user who is connecting to the electronic meeting system logs in using the user name 1542 (or the e-mail address 1544) and the password 1545 that are set in the user management information 154.

The server device 200 configures screens according to the access level of the user, and the user is able to view screens according to his or her access level (see FIG. 5).

A user who is connected to the electronic meeting system is able to share images of his or her desktop screen or from a camera of the terminal device 300 on the electronic meeting system. It is assumed that only users who satisfy the access level of the user who shared the images are able to view this shared screen.

A user who has an access level equivalent to the control device 100 is able to update the setting information 150 on the electronic meeting system.

The control device 100 closely examines the contents of the setting information 150 at the time of startup, and configures error settings serving as a PLC function in the case where some sort of conflict arises. Alternatively, the control device 100 closely examines the update contents of the setting information 150 that are set from the electronic meeting system, and performs an error response and does not update the setting information 150 in the case where some sort of conflict arises.

A variable name for displaying the status of the control device 100 may be set as a reserved variable name of the variable management information 152. For example, the variable name can be set to "PLC_Status". In this case, the value of this variable can be converted into text and displayed in the user list 410 (FIG. 5) of the electronic meeting system.

In relation to communication within an electronic meeting system (communication between the control device 100, the server device 200 and the terminal devices 300), the control device 100 preferably supports a plurality of communication protocols (including authentication processing and encryption processing) in order to support various types of electronic meeting systems.

Note that information such as the contents of communication protocols, the language of the data object format discussed later, the type of electronic meeting system, and the encryption method of passwords in the user management information 154 is stored in the system information of the control device 100, and can preferably be set by an administrator.

G. Processing Procedures in Maintenance System 1

Next, typical processing procedures in the maintenance system 1 of the present embodiment will be described.

g1: When Starting Control Device 100

Figure 10:
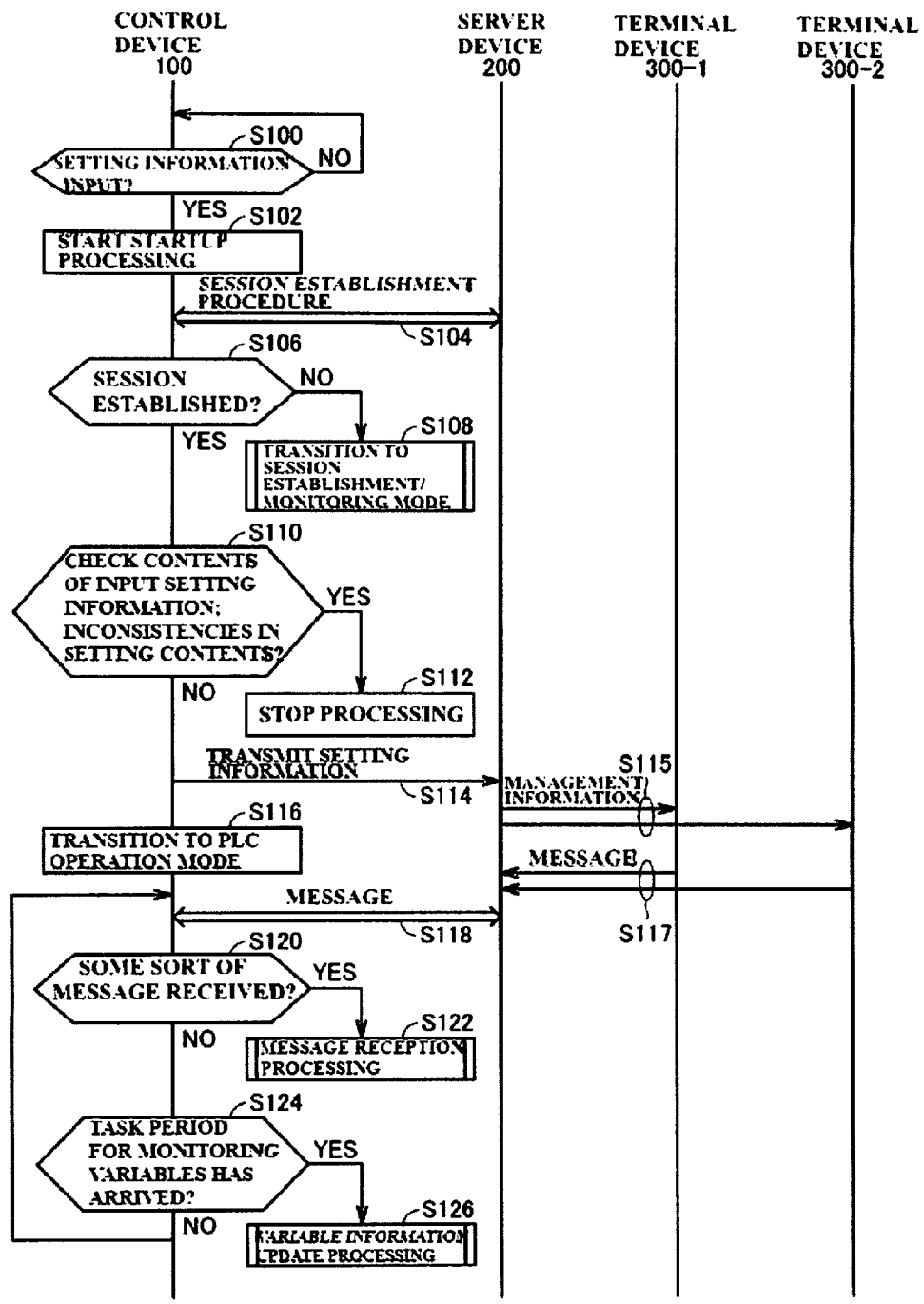
FIG. 10 is a diagram showing a processing procedure when starting the control device in the maintenance system of the present embodiment.

In the maintenance system 1 of the present embodiment, a connection to the electronic meeting system is established, triggered by the control device 100 starting up. FIG. 10 is a diagram showing a processing procedure at the startup time of the control device 100 in the maintenance system 1 of the present embodiment. The overall processing procedure from startup of the control device 100 until transition to a normal mode (PLC operation mode) is shown in FIG. 10.

Referring to FIG. 10, when powered on or when instructed to start operation, the control device 100 determines whether setting information 150 has been input (step S100). If setting information 150 has not been input (NO in step S100), the control device 100 waits for setting information 150 to be input. At this time, the user is notified by some sort of method that setting information 150 has not been input.

If setting information 150 has been input (YES in step S100), the control device 100 starts startup processing (step S102). The control device 100 then performs a procedure for establishing a session with the server device 200 (step S104). The control device 100 determines whether a session has been established as a result of this procedure (step S106). If a session has not been established (NO in step S106), the control device 100 transitions to a session establishment/monitoring mode discussed later (step S108). Processing in the session establishment/monitoring mode will be described in detail with reference to FIG. 13.

If a session has been established (YES in step S106), the control device 100 checks the contents of the input setting information 150 and determines whether there are any inconsistencies in the setting contents (step S110).

If there is an inconsistency in the setting contents of the input setting information 150 (YES in step S110), the control device 100 stops the processing (step S112). Note that users may be notified by some sort of method that processing by the control device 100 has stopped.

If there are no inconsistencies in the setting contents of the input setting information 150 (NO in step S110), the control device 100 transmits the setting information 150 to the server device 200 (step S114). The control device 100 then transitions to the PLC operation mode (step S116). Note that the server device 200 transmits the setting information 150 received from the control device 100 to the terminal devices 300 as needed (step S115).

In the PLC operation mode, the control device 100 determines whether some sort of message has been received from the server device 200 or the terminal devices 300 (step S120). One of the terminal devices 300 transmits some sort of message to the electronic meeting system in accordance with a user operation (step S117). The server device 200, upon receipt of some sort of message from one of the terminal devices 300, transfers this message to the control device 100 in order to distribute the message (step S118). The control device 100 receives the message transferred from the server device 200.

When some sort of message is received (YES in step S120), the control device 100 starts message reception processing discussed later (step S122). The message reception processing will be described in detail with reference to FIG. 11.

On the other hand, if some sort of message is not received (NO in step S120), the control device 100 determines whether a task period for monitoring variables has arrived (step S124). If the task period has arrived (YES in step S124), the control device 100 starts variable information update processing discussed later (step S126). The variable information update processing will be described in detail with reference to FIG. 12.

On the other hand, if the task period has not arrived (NO in step S124), the processing up to step S118 is repeated.

g2: Message Reception Processing

Figure 11:
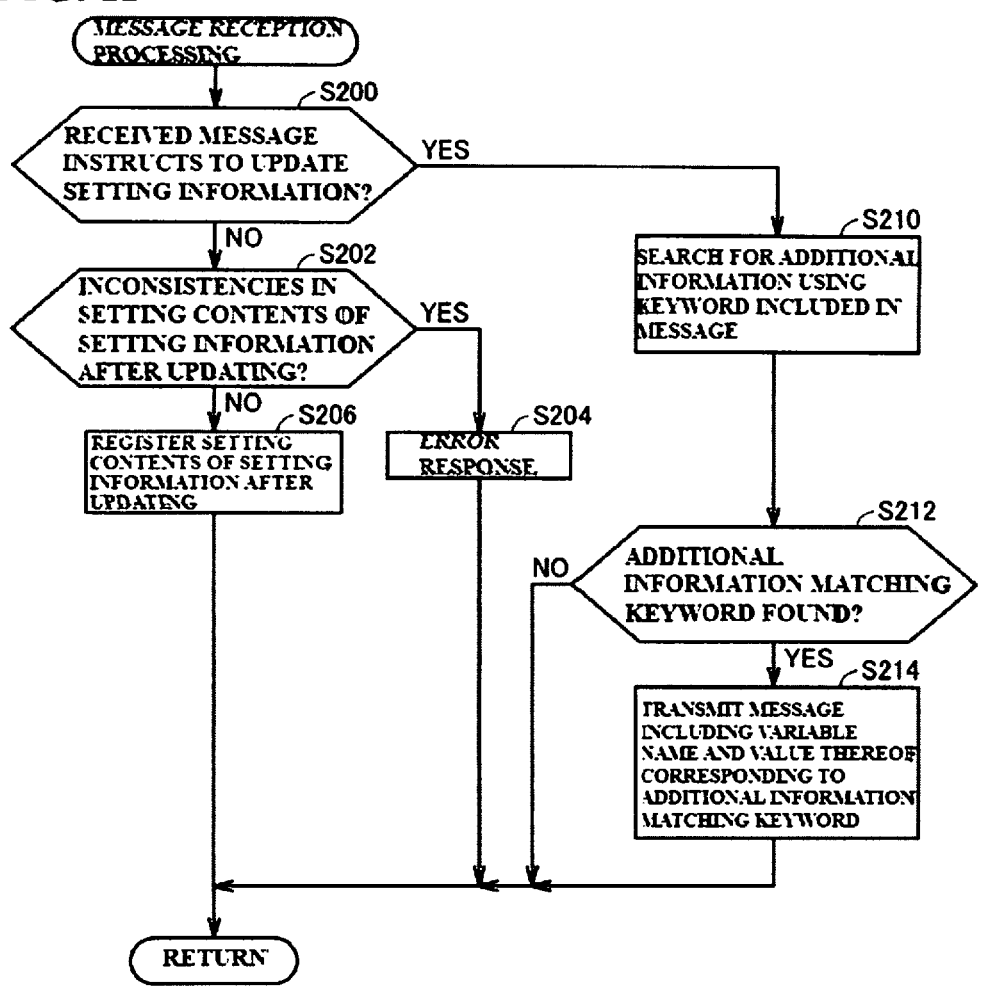
FIG. 11 is a flowchart showing a processing procedure of message reception processing shown in step S122 of FIG. 10.

Next, the message reception processing shown in step S122 of FIG. 10 will be described in detail. FIG. 11 is a flowchart showing a processing procedure of the message reception processing shown in step S122 of FIG. 10. The message reception processing shown in FIG. 11 is executed in the case where some sort of message is received from the server device 200 or the like.

More specifically, referring to FIG. 11, the control device 100 determines whether the message received from another device is a message instructing to update the setting information 150 (step S200). If the message received from another device is a message instructing to update the setting information 150 (YES in step S200), the control device 100 updates the setting information 150 in accordance with the received message, checks the contents of the setting information 150 after updating, and determines whether there are any inconsistencies in the setting contents (step S202). If there is an inconsistency in the setting contents of the setting information 150 after updating (YES in step S202), the control device 100 performs an error response and does not update the setting information 150 (step S204). The processing then returns.

On the other hand, if there are no inconsistencies in the setting contents of the setting information 150 after updating (NO in step S202), the control device 100 registers the setting contents of the setting information 150 after updating (step S206).

On the other hand, if the message received from another device is not a message instructing to update the setting information 150 (NO in step S200), the control device 100 searches the additional information 1526 that is defined in the variable management information 152, using a keyword that is included in the message (step S210). The control device 100 then determines whether additional information 1526 matching the keyword that is included in the received message was found (step S212).

If additional information 1526 matching the keyword that is included in the received message was found (YES in step S212), the control device 100 transmits a message including the variable name and the value thereof corresponding to the additional information 1526 matching the keyword to the server device 200 (electronic meeting system) (step S214). The processing then returns.

On the other hand, if additional information 1526 matching the keyword that is included in the received message is not found (NO in step S212), the control device 100 returns the processing.

That is, the processing of steps S202 and S206 constitute processing in which the control device 100 updates held setting information 150 using commands from an external device, and steps S210 to S214 constitute processing in which the control device 100 responds with a requested variable and the value thereof in response to a message sent from an external device. The control device 100 thus performs a search as to whether there exists attribute information corresponding to text that is included in a message distributed from the server device 200, and, when attribute information corresponding to the text is retrieved, transmits input/output information corresponding to the retrieved attribute information to the server device 200.

The control device 100 of the present embodiment thus automatically executes processing that was registered in advance or was designated in a message posted by a user, according to the contents of the message. In other words, from the user's perspective, if there is a certain facility that he or she wants to know about, the user need only transmit a message that includes information specifying the facility, and the control device 100 will automatically distinguish the contents of the message and respond with the designated information (state of the facility, etc.). In the present embodiment, because such message-based interactive processing is also employed, implementation is possible using not only an electronic meeting system such as mentioned above but also systems such as chat systems and MMS, for example. Furthermore, with a chat system or MMS, still images and/or moving images can also be transmitted and received, and interactive maintenance work with the control device 100 can be realized by utilizing these functions.

g3: Variable Information Update Processing

Figure 12:
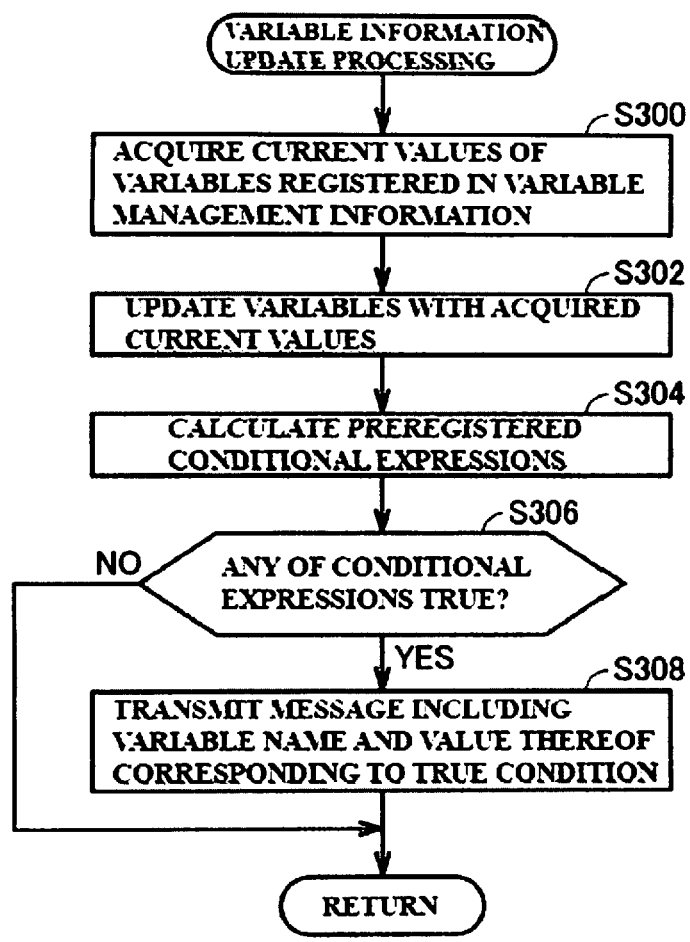
FIG. 12 is a flowchart showing a processing procedure of variable information update processing shown in step S124 of FIG. 10.

Next, the variable information update processing shown in step S124 of FIG. 10 will be described in detail. FIG. 12 is a flowchart showing a processing procedure of the variable information update processing shown in step S124 of FIG. 10. The variable information update processing shown in FIG. 12 is processing for transmitting a message to the electronic meeting system, triggered by a predetermined notification condition (conditional expression) being satisfied due to a change occurring in information in a field managed by the control device 100.

More specifically, referring to FIG. 12, the control device 100 acquires the current values of variables registered in the variable management information 152 (step S300), and updates the variables with the acquired current values (step S302). Then, the control device 100 calculates the preregistered conditional expressions using the current values of the variables (and the pre-update values as needed) (step S304). The control device 100 then determines whether any of the conditional expressions are true (i.e., whether any of the conditional expressions are satisfied) (step S306).

If one of the conditional expressions is true (YES in step S306), the control device 100 transmits a message including the variable name and the value thereof corresponding to the true condition to the server device 200 (electronic meeting system) (step S308). The processing then returns.

On the other hand, if none of the conditional expressions are true (NO in step S306), the processing returns.

That is, the variable information update processing shown in FIG. 12 is processing for notifying the contents of the change to the electronic meeting system, in the case where there is any sort of change in the variables that are monitored by the control device 100.

g4: Session Establishment Monitoring Mode

Figure 13:
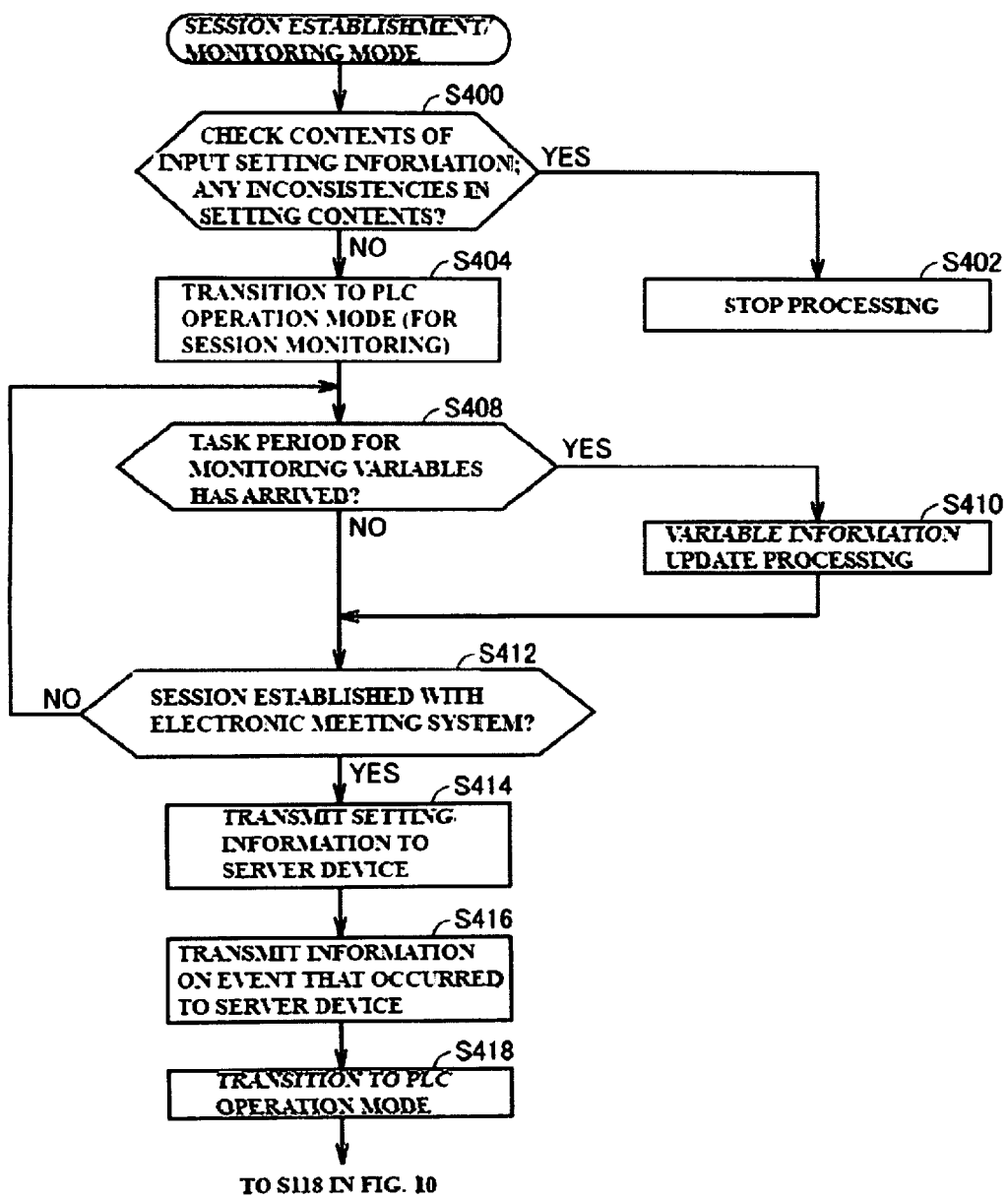
FIG. 13 is a flowchart showing a processing procedure in a session establishment/monitoring mode shown in step S108 of FIG. 10.

Next, the session establishment/monitoring mode shown in step S108 of FIG. 10 will be described in detail. FIG. 13 is a flowchart showing a processing procedure in the session establishment/monitoring mode shown in step S108 of FIG. 10.

The session establishment/monitoring mode shown in FIG. 13 envisages a usage configuration such as where the control device 100 is not normally connected to the electronic meeting system, and is connected to the electronic meeting system as result of an on-site worker or the like only network-connecting the control device 100 in cases such as where some sort of anomaly occurs in a control target. That is, the session establishment/monitoring mode is a mode in which the electronic meeting system in which the control device 100 is involved is not activated when there are no anomalies, and in which the electronic meeting system is activated when some sort of anomaly or event occurs in a machine that is being controlled. In other words, the control device 100 starts a network connection with the server device 200 when the occurrence of a preregistered anomaly is detected.

In this session establishment/monitoring mode, the control device 100 generally only performs monitoring of registered variables, and normally does not notify any events. At the point in time, however, at which an on-site worker or the like connects the control device 100 to the network and a network connection is confirmed, users participating in the electronic meeting system start sharing information as a result of the control device 100 transmitting the setting information 150 and event information to the electronic meeting system. Also, in the case where an anomaly that occurred in a device is resolved, an administrative user may utilize an interface of the electronic meeting system to terminate the electronic meeting system.

More specifically, referring to FIG. 13, the control device 100 checks the contents of the input setting information 150 and determines whether there are any inconsistencies in the setting contents (step S400).

If there is an inconsistency in the setting contents of the input setting information 150 (YES in step S400), the control device 100 stops the processing (step S402). Note that users may be notified by some sort of method that the processing by the control device 100 has stopped.

If there are no inconsistencies in the setting contents of the input setting information 150 (NO in step S400), the control device 100 transitions to the PLC operation mode (for session monitoring) (step S404).

In the PLC operation mode (for session monitoring), the control device 100 determines whether the task period for monitoring variables has arrived (step S408). If the task period has arrived (YES in step S408), the control device 100 starts the variable information update processing (step S410). The variable information update processing was described in detail with reference to the above-mentioned FIG. 12. Because transmission is not, however, possible in the variable information update processing of step S410 even when some sort of event occurs, information on the event that occurred is temporarily buffered at this time.

After the execution of step S410 or if the task period has not arrived (NO in step S408), the control device 100 determines whether a session with the electronic meeting system has been established (step S412).

If a session with the electronic meeting system has not been established (NO in step S412), the processing up to step S408 is repeated.

On the other hand, if a session with the electronic meeting system has been established (YES in step S412), the control device 100 transmits the setting information 150 to the server device 200 (electronic meeting system) (step S414). Then, the control device 100 transmits the information on the event that occurred to the server device 200 (electronic meeting system) (step S416). The control device 100 then transitions to the PLC operation mode (step S418). Thereafter, the processing from step S118 shown in FIG. 10 is executed.

H. Communication Interface and Data Structure Used Therefor

In the maintenance system 1 of the present embodiment, various data objects need to be shared between the control device 100, the server device 200 and the terminal devices 300, thus making it preferable to prepare a general-purpose data object format and exchange data in accordance with that format. Hereinafter, the data object format according to respective communication phases will be described.

FIG. 14 is a diagram showing an exemplary data object format 500 that is used in the maintenance system 1 of the present embodiment. Referring to FIG. 14, the data object format 500 includes items 502 to 518. In the electronic meeting system, the functions that are provided by the maintenance system 1 of the present embodiment are realized by exchanging data between the control device 100 and the server device 200 using the data object format 500.

Note that the data object format 500 may support a plurality of languages such as XML and JSON. Note also that, in the data object format 500, Severity and Status can be suitably set.

Hereinafter, description will be given regarding how the data object format 500 shown in FIG. 14 is used in each communication phase. That is, the communication interface between the control device 100 and the server device 200 will be described.

h1: Registration of Management Information (Transmission from Control Device 100 to Server Device 200)

Communication contents in case where the control device 100 registers (adds, updates, deletes) management information in the server device 200 will be described. The control device 100 handles two types of management information, namely, the user management information 154 and the screen configuration information 156.

(1) Adding, Updating or Deleting User Management Information 154 from Control Device 100 to Server Device 200

In this case, a data format including four items consisting of item 502, item 504, item 506 and item 510 is used from the data object format 500 shown in FIG. 14. Note that the primary key that is used when updating (Update) or deleting (Delete) is assumed to take the ID value of User (item 510).

(2) Adding, Updating or Deleting Screen Configuration Information 156 from Control Device 100 to Server Device 200

In this case, a data format including four items consisting of item 502, item 504, item 506 and item 512 is used from the data object format 500 shown in FIG. 14. Note that the primary key that is used when updating (Update) or deleting (Delete) is assumed to take the ID value of Screen (item 512).

h2: Response from Server Device 200 to Control Device 100

Communication contents in the case of the server device 200 transmitting a response to the control device 100 will be described. In this case, a data format including four items consisting of item 502, item 504, item 506 and item 518 is used from the data object format 500 shown in FIG. 14.

h3: Notification from Control Device 100 to Server Device 200

Communication contents in the case of the control device 100 notifying the server device 200 will be described. In this case, a data format including four items consisting of item 502, item 504, item 506 and item 514 is used from the data object format 500 shown in FIG. 14. Note that a similar format is also used in the case of updating the status of the PLC (PLC_Status).

h4: Inquiry from Terminal Device 300 to Control Device 100

(1) Case where a User (Terminal Device 300) Makes an Inquiry to the Control Device 100

In this case, a data format including four items consisting of item 502, item 504, item 506 and item 516 is used from the data object format 500 shown in FIG. 14. Note that a similar format is also used in the case where the control device 100 monitors communication (contents of messages) between participants in an electronic meeting system.

(2) Case where a Response Result is Transmitted from the Control Device 100 to a User (Terminal Device 300)

In this case, a data format including four items consisting of item 502, item 504, item 506 and item 514 is used from the data object format 500 shown in FIG. 14.

h5: Transmission from Server Device 200 to Control Device 100

Communication contents in the case of updating (adding, updating, deleting) management information that is held by the control device 100 from the server device 200 will be described.

The server device 200 handles three types of management information, namely, the variable management information 152, the user management information 154, and the screen configuration information 156.

(1) Case where the Variable Management Information 152 is Added, Updated or Deleted from the Server Device 200 to the Control Device 100

In this case, a data format including four items consisting of item 502, item 504, item 506 and item 508 is used from the data object format 500 shown in FIG. 14. Note that the primary key that is used when updating (Update) or deleting (Delete) is assumed to take the ID value of Variable (item 508).

(2) Case where the User Management Information 154 is Added, Updated or Deleted from the Server Device 200 to the Control Device 100

In this case, a data format including four items consisting of item 502, item 504, item 506 and item 510 is used from the data object format 500 shown in FIG. 14. Note that the primary key that is used when updating (Update) or deleting (Delete) is assumed to take the ID value of User (item 510).

(3) Case where the Screen Configuration Information 156 is Added, Updated or Deleted from the Server Device 200 to the Control Device 100

In this case, a data format including four items consisting of item 502, item 504, item 506 and item 512 is used from the data object format 500 shown in FIG. 14. Note that the primary key that is used when updating (Update) or deleting (Delete) is assumed to take the ID value of Screen (item 512).

(4) Case where a Response Result is Transmitted from the Control Device 100 to the Server Device 200

In this case, a data format including four items consisting of item 502, item 504, item 506 and item 518 is used from the data object format 500 shown in FIG. 14.

Upon receiving a normal response from the control device 100, the server device 200 registers the update contents.

I. Modification

Although it was envisaged in the above-mentioned embodiment that terminal devices 300 that are actually used by users participate in the electronic meeting system, a configuration may be adopted in which other agents participate. For example, virtual terminals on a cloud may be introduced as participants in the electronic meeting system of the present embodiment. Scalability and availability can be improved by introducing such virtual terminals.

Also, a function of saving a log of operations performed from the terminal devices 300 and operations performed by each user in the electronic meeting system to the electronic meeting system (server device 200) may be implemented. The implementation of such a log function will be verifiable from a plurality of viewpoints ex post.

Also, a configuration may be adopted in which means for notifying the status of the control device 100 to users more accurately, such a widget that takes its motif from a Patlite (registered trademark), for example, can be added on the desktop of terminal devices 300 connected to the maintenance system 1 of the present embodiment.

J. Advantages

As a conventional example of maintenance of a facility from a remote location, a personal computer installed on-site is connected via a VPN, enabling a kind of one-to-one network connection environment. An on-site worker and the user who is the device vendor share information by e-mail, phone or the like, and it is necessary to visit the site when communication is insufficient. Because such a conventional technique requires parallel use of a plurality of communication means, and, furthermore, involved a one-to-one network connection, it is not possible for a plurality of people to consult together and come up with a solution.

In contrast, with the maintenance system 1 of the present embodiment, messages, audio, moving images and information on devices can all be shared on a cloud with an electronic meeting system as a base, enabling communication speed to be improved and an increase in maintenance efficiency to be realized. That is, because required information can be shared centrally, the degree of communication can be enhanced, even in the case of users at remote locations.

With the maintenance system 1 of the present embodiment, access restrictions are realized using techniques such as access levels, and consideration is also given to security in the form of only providing required information to required users. Also, from a security point of view, with an electronic meeting system that is multipoint-connected, a configuration may be adopted in which the server device 200 holds sharing-related data while the system is activated (i.e., is online), and then when the system is deactivated (i.e., goes offline), data that is being temporarily held is automatically deleted. Employing such a configuration enables an increase in operational efficiency to be achieved by allowing maintenance work to be performed while sharing information with not only on-site workers and administrators of the company that maintains a certain factory but also with the device vendor who supplied the devices to the factory, as well as enabling the risk of information leaks and the like to be reduced because of data used in the maintenance work no longer being accessible once the maintenance work has been completed. That is, two conflicting problems, namely, increasing the operational efficiency of maintenance work through information sharing and reducing the risk of information leaks resulting from information sharing, can be resolved. Note that the level of security can also be enhanced in the case of collecting a log of activities in the electronic meeting system (server device 200), by applying restrictions such as limiting the log to only operations performed by the users.

In the electronic meeting system of the present embodiment, a plurality of users can be multipoint-connected to enable sharing of states. A multipoint-connection also enables other users to check the actions of any given user. Thus, even in cases such as where, for example, some sort of trouble arises with one of the devices, and the device vendor who supplied the device performs remote operations on the control device 100 that controls the device in order to carry out maintenance activities, on-site workers and administrators of the company that maintains the factory are able to check the operations of the device vendor in real time, and are thus able to prevent erroneous operation by the device vendor and intentional unauthorized behavior.

In the maintenance system 1 of the present embodiment, the control device 100 holds setting information 150 for setting up an electronic meeting system, thereby enabling appropriate maintenance to be realized by the control device 100 that controls the devices, that is, under the initiative of the factory in which the devices are installed.

The presently disclosed embodiments are considered in all respects to be illustrative and not restrictive. The scope of the invention is indicated by the appended claims rather than the foregoing description and all changes that come within the meaning and range of equivalents thereof are intended to be embraced therein.

The invention claimed is:

1. A network system comprising:
    at least one terminal device;
    a control device; and
    a server device comprising a processor configured with a first one or more programs to perform operations comprising:
        receiving data including at least one of image data and audio data from at least one of the control device and the terminal device that are connected via a network, and
        distributing the received data to a different device from the device that transmitted the data, wherein
    the control device comprises:
    a controller configured with a second one or more programs to perform operations comprising:
        executing a control operation on a machine;
        receiving a message distributed from the server device;
        performing a search of variable management information stored on the control device to determine whether text included in the message matches a keyword associated with a variable included in the variable management information;
        retrieving a name of the variable and a value of the variable when the keyword associated with the variable is found in the search; and
        transmitting the name of the variable and the value of the variable associated with the keyword to the server device; and
        transmitting data indicating an operational state of the machine that is controlled to the server device, and a memory storing setting information that associates the name of the variable with the value of the variable collected from the machine that is controlled; and the terminal device comprises a display unit configured to display the operational state of the machine controlled by the control device together with a state of another terminal device connected to the server device.

2. The network system according to claim 1, wherein the setting information defines users that can access respective data held by the server device, and the processor of the server device is configured with the first one or more programs to perform operations further comprising causing the server device to restrict users that can access the data held by the server, in accordance with the setting information from the control device.

3. The network system according to claim 1, wherein the controller of the control device is configured with the second one or more programs to perform operations further comprising causing the control device to start a network connection with the server device when an occurrence of a preregistered anomaly is detected.

4. A control device for controlling a machine, comprising:

a controller configured with a first one or more programs to perform operations comprising:
  network-connecting to a server device and at least one terminal device; and
  executing a control operation on the machine, wherein the server device comprises a processor configured with a second one or more programs to perform operations comprising receiving data including at least one of image data and audio data from at least one of the control device and the terminal device that are connected via a network, and distributing the received data to a different device from the device that transmitted the data, and the controller of the control device is further configured with the first one or more programs to perform operations comprising:
  transmitting data indicating an operational state of the machine that is controlled to the server device,
  receiving a message distributed from the server;
  performing a search of variable management information stored on the control device to determine whether text included in the matches a keyword associated with a variable included in the variable management information;
  retrieving a name of the variable and a value of the variable when the keyword associated with the variable is found in the search; and
  transmitting the name of the variable and the value of the variable associated with the keyword to the server device; and a memory storing setting information associating the name of the variable with the value of the variable collected from the machine that is controlled.

5. The control device according to claim 4, wherein the setting information defines users that can access respective data held by the server device, and the processor of the server device is configured with a program to cause the server device to restrict users that can access the held data, in accordance with the setting information from the control device.

6. The control device according to claim 4, wherein wherein the controller of the control device is configured with the program to cause the control device to start a network connection with the server device when an occurrence of a preregistered anomaly is detected.

* * * * *